United States Patent [19]

Diem et al.

[11] Patent Number: 4,458,049

[45] Date of Patent: Jul. 3, 1984

[54] PREPARATION OF COCONDENSATES WHICH PRODUCE WEATHER-RESISTANT BONDING

[75] Inventors: Hans Diem, Mannheim; Robert Fritsch, Dudenhofen; Heinz Lehnert; Guenther Matthias, both of Frankenthal; Hermann Schatz, Neustadt; Otto Wittmann, Frankenthal, all of Fed. Rep. of Germany

[73] Assignee: BASF Aktiengesellschaft, Fed. Rep. of Germany

[21] Appl. No.: 393,631

[22] Filed: Jun. 30, 1982

[30] Foreign Application Priority Data

Jul. 1, 1981 [DE] Fed. Rep. of Germany ....... 3125874
Nov. 14, 1981 [DE] Fed. Rep. of Germany ....... 3145328

[51] Int. Cl.³ .................. C08K 3/24; C08L 61/14; C09J 1/00; C09J 3/16
[52] U.S. Cl. .................... 524/595; 156/331.9; 525/390; 525/398; 524/501; 524/541; 524/596
[58] Field of Search .............. 524/595, 596, 501, 541; 156/331.9; 525/390, 398

[56] References Cited

U.S. PATENT DOCUMENTS

| | | | |
|---|---|---|---|
| 2,190,239 | 2/1940 | Menger | 524/541 |
| 2,205,427 | 6/1940 | Loos | 524/541 |
| 2,407,599 | 9/1946 | Auten et al. | 521/39 |
| 2,522,569 | 9/1950 | Day et al. | 521/29 |
| 2,834,705 | 5/1958 | Marcucio et al. | 156/331.9 |
| 3,306,864 | 2/1967 | Lang et al. | 524/541 |
| 3,389,125 | 6/1968 | Dietrick et al. | 525/398 |
| 3,629,176 | 12/1971 | Shriver | 156/331.9 |
| 3,658,622 | 4/1972 | Horowitz et al. | 156/331.9 |
| 3,734,918 | 5/1973 | Mayer et al. | 156/331.9 |
| 4,285,848 | 8/1981 | Hickson | 524/596 |

FOREIGN PATENT DOCUMENTS

| | | | |
|---|---|---|---|
| EP38408 | 10/1981 | European Pat. Off. | 156/331.9 |
| 87335 | 3/1895 | Fed. Rep. of Germany . | |
| 696581 | 8/1940 | Fed. Rep. of Germany . | |
| 2020481 | 10/1973 | Fed. Rep. of Germany . | |
| 2158610 | 3/1976 | Fed. Rep. of Germany . | |
| 2550739 | 5/1977 | Fed. Rep. of Germany | 156/331.9 |
| 1284233 | 1/1962 | France . | |
| 53-92892 | 8/1978 | Japan | 524/596 |

OTHER PUBLICATIONS

J. Org. Chem. 10 (1945), p. 477 (pp. 470-478).

*Primary Examiner*—Ronald W. Griffin
*Attorney, Agent, or Firm*—Keil & Weinkauf

[57] ABSTRACT

An aqueous solution of a resin glue comprising formaldehyde, urea, melamine and phenol is obtained when phenol, formaldehyde and not more than 0.35 mole of an alkali metal bisulfite per mole of phenol are reacted to give a phenol-formaldehyde condensate, formaldehyde and urea in a molar ratio of not more than 2.5 are reacted to give a urea-formaldehyde condensate, and the reaction products are in turn reacted with melamine and formaldehyde.

4 Claims, No Drawings

PREPARATION OF COCONDENSATES WHICH PRODUCE WEATHER-RESISTANT BONDING

German Pat. No. 2,020,481 discloses the preparation of cocondensates which produce weather-resistant bonding and comprise formaldehyde, urea, melamine and a minor amount of phenol, a particular sequence of measures being employed in the condensation.

The resulting condensates, like most of the aminoplast condensates, therefore have only a limited solubility in aqueous solution, and in particular, as the concentration decreases, are precipitated and form lumps, which are highly adhesive, thereby making it very difficult to use the resin solutions. This well-known effect can be eliminated, in some cases only, by drastic chemical modification of the condensates, but the resulting resins are virtually useless as glues.

A further disadvantage of the above cocondensates is that in the hardened state they readily release formaldehyde and can therefore be used only in woodbase materials in which this disadvantage is acceptable. However, an increasing awareness of the environmental aspect makes it necessary to find chemically stabler agents for bonding wood.

It is an object of the present invention to provide resins which disperse when diluted and release less formaldehyde after processing.

We have found that this object is achieved by a procedure which departs from the prior principle of condensing phenol and formaldehyde with a preformed aminoplast and in which phenol, formaldehyde and an alkali metal sulfite are first reacted, and the product is added to the aminoplastic resin constituents either before or during the condensation of the latter; presumably, the sulfite-modified phenoplast reacts with the aminoplast to some extent.

The present invention therefore relates to a process for the preparation of aqueous solutions of condensates which can be used as resin glues and comprise formaldehyde and at least urea, melamine and phenol, the molar ratio of phenol to the sum of melamine and urea being not more than 0.25:1 and the molar ratio of urea to melamine being from 0.2:1 to 1:0.2 for a total molar ratio of formaldehyde to the sum of melamine, urea and phenol of from about 1.1 to 2, wherein (a) phenol, formaldehyde and not more than 0.35 mole of an alkali metal bisulfite per mole of phenol are reacted to give a phenol-formaldehyde condensate, and (b) formaldehyde and urea in the molar ratio of not more than 2.5:1 are reacted to give a urea-formaldehyde condensate, and (c) the products (a) and (b) together in turn are reacted with melamine and formaldehyde in such a ratio that the molar ratios of melamine, urea, phenol and formaldehyde mentioned at the outset are either obtained directly or (d) may be obtained only after the product obtained according to (c) is reacted further with urea in an amount of not more than 75% of the total amount of urea intended.

The preparation of sulfite-modified phenol-formaldehyde condensates has been disclosed, and is useful in connection with the production of synthetic tanning agents (cf., for example, German Pat. Nos. 87,335, 696,581 and 2,158,610, and U.S. Pat. No. 2,522,569).

The chemical relationships are described, for example, in J. Org. Chem. 10 (1945), 477 et seq.

Sulfite-modified aminoplast resins, also, have been used industrially for the production of wet-strength papers; for this purpose, the aminoplasts must be rendered water-soluble so that they can be adequately diluted during the sheet-forming process on the paper machine (cf. U.S. Pat. No. 2,407,599).

The fact that aminoplasts may be made compatible with water by modification with sulfates, ie. by incorporation of sulfonic acid radicals, is therefore of no use in respect of the object of the invention, ie. the production of resin glues.

In fact, resin glues, at any rate in the hardened state, should be very resistant to attack by water. The incorporation of sulfonic acid radicals in resin glues does not suggest that this precondition will be achieved and indeed leads in a direction contrary to that of the invention.

That the above arguments are correct may be seen, for example, from the following considerations:

Experience with chemically homogeneous condensates has shown that the presence in particular of melamine condensates, which have a particularly strong tendency to form lumps, leads to serious problems during dilution. The problem cannot be solved in this case by introducing sulfite into the melamine condensate or by adding sulfite to all the reactants.

In fact, the resins obtained according to the invention are not water-soluble but, as stated, water-dispersible, so that when the resins are diluted, emulsions are obtained which can be handled technically as solutions.

Moreover, the resins obtainable according to the invention have the following advantages: they have, in general, a shelf life of 6 weeks or more; after processing to give wood-based materials, they usually release less than 10 mg of formaldehyde per 100 g of resin (measured by the FESYP method); they possess adequate boil resistance and adequate moisture resistance; and they can still be readily pumped even at a low temperature, eg. +5°.

A detailed description of the invention is best given in the form of process stages, the conventional abbreviations for phenol (P), melamine (M), urea (U) and formaldehyde (F) being employed, S being sulfite, and M.R. being the molar ratio of formaldehyde to the particular reactant or reactants used.

Accordingly, the following parameters apply to stage 1, ie. P+F+S, condensate 1 (PFS):

M.R. (F:P)=1-10
M.R. (S:P)=0.02-0.35
pH: about 7.5-12
T: about 50°-150° C. (under atmospheric or superatmospheric pressure)
Viscosity: for example 100-15,000 mPa.s, depending on the degree of condensation and the concentration (solids content about 30-80%).

As mentioned at the outset, the reaction as such is a conventional one, and the phenol employed may be phenol itself, cresols, or their industrial mixtures.

The alkali metal bisulfite employed is usually the sodium salt, and any further adjustment of the pH required may then advantageously be effected with sodium hydroxide solution; potassium salt may, of course, also be used.

Preferably, the molar ratio (F:P) is from 1.5 to 3, in particular from 1.8 to 2.5, the molar ratio (S:P) is from 0.05 to 0.3, in particular from 0.1 to 0.25, and the pH is from 8 to 10, in particular from 8.5 to 9.5.

For technical reasons, the reaction is most advantageously carried out at from 80° to 95° C., ie. the condensation is carried out under atmospheric pressure and at the highest temperature achievable without great evaporative loss. Of course, it is also possible in principle to carry out the condensation under superatmospheric pressure and at a correspondingly higher temperature.

For ease of handling of the solutions, the latter conventionally have a solids content of condensate of about 55–65%, and this is also satisfactory in the present case.

The urea resins (UF) which are required for the reaction and have a molar ratio of not more than 2, or their solutions, are well-known and also commercially obtainable, so that it is not necessary to describe their preparation here. Most of the solutions have a solids content of about 50–70%, which is also satisfactory for the purposes of the invention.

The PFS condensate obtained in the reaction referred to above as stage 1, the urea resin UF, melamine and further formaldehyde are then reacted to give the novel resin.

The amounts of PFS, UF, M and F may be chosen at the outset so that the desired product is obtained, ie. a resin containing not more than 0.25 mole of phenol per mole of aminoplast formers (U+M), from 0.2 to 1 mole of urea per mole of melamine (or mole of M per mole of U), and a total ratio of formaldehyde to the sum M+P+U of about 1.1–2.

Thus, preferred resins have a molar ratio of phenol to the sum of melamine and urea of from 0.05:1 to 0.25:1, but resins containing a smaller proportion of phenol than the above minimum value also exhibit the advantages according to the invention.

According to experience, the smallest amount of phenol which has a noticeably advantageous effect by permitting lump-free dilution with water is about 0.02 mole/mole; this depends in individual cases on the condensation procedure.

In another, preferred process, in principle the same molar ratios are chosen for the end product, but a part of the theoretically required amount of urea is added only at the end of the reaction, in a third process step.

In practice, this means that the stated amount of the condensate from stage 1 (PFS), somewhat less UF and somewhat more F are reacted with the stated amount of M (stage 2), and the theoretically lacking amount of U is added only at the end (stage 3).

In this case, the pH, temperature and viscosity given for stage 1 also apply to stage 2; the molar ratios are adjusted to take into account the fact that about 75% of the total intended urea content of the end product is not added in the form of the UF condensate, but instead the appropriate amount of formaldehyde is added in free form, ie. as a conventional solution.

When the product of the intended reaction (stage 2) has the desired viscosity, the mixture is advantageously allowed to cool and the remainder of the urea is added during cooling; the viscosity usually decreases during this procedure, particularly since the urea is advantageously used in the form of a concentrated aqueous solution, which is the form of urea conventionally used in industry.

The extent of reaction between urea and the preformed condensate is unimportant for the invention.

After the solution has been cooled to room temperature, it has a pH of about 9 and may be used directly.

The parameters, according to the invention, of the individual process stages are summarized once again in the table below.

| Parameter | According to the invention | Preferred | Particularly preferred |
|---|---|---|---|
| Stage 1 S 1 = P + F + S | | | |
| pH | 7.5–12 | 8–10 | 8.5–9.5 |
| T (°C.) | 50–150 | 70–100 | 80–95 |
| Viscosity (mPa.s) | 100–15,000 | 300–5,000 | 300–1,000 |
| Molar ratios | | | |
| F:P | 1.0–10 | 1.5–3 | 1.8–2.5 |
| S:P | 0.02–0.35 | 0.05–0.30 | 0.1–0.25 |
| Solids content (%) | 30–80 | 40–70 | 45–65 |
| Stage 2 S 2 = S 1 + M + F + UF | | | |
| pH | 7.5–11 | 8–10 | 8.5–9.5 |
| T (°C.) | 75–150 | 75–100 | 80–95 |
| Viscosity (mPa.s) | 300–2,500 | 500–2,000 | 600–1,200 |
| Molar ratios: | | | |
| M:P | 20–1.2 | 10–1.6 | 7–2 |
| Urea resin UF (F:U) | 1.0–2.5 | 1.0–2 | 1.1–1.9 |
| Stage 3 S 3 = S 2 + U | | | |
| pH | 7.5–11 | 8–10 | 8.5–9.5 |
| T (°C.) | 10–60 | 20–50 | 25–45 |
| Viscosity (mPa.s) | 150–1,000 | 200–800 | 350–650 |
| Proportion of U (mole %) | not more than 25 | 5–20 | 5–20 |
| Solids content (%) | 50–75 | 60–70 | 62–66 |

The examples which follow illustrate the invention; parts are by weight, unless stated otherwise. If, for example, parts by weight are replaced by kilograms, they serve as a practical guide for industrial use.

EXAMPLE 1

Stage 1 (S1)

431.5 Parts (5.75 molar parts of $CH_2O$) of a 40% strength by weight aqueous formaldehyde solution 269.7 parts (2.87 molar parts) of phenol and 44.9 parts (0.36 molar part) of sodium sulfite are heated to 60° C., while stirring, and the sodium sulfite dissolves. The temperature increases to 100° C. as a result of the reaction, and the pH is 9. The mixture is brought to 90° C., kept at this temperature until the viscosity corresponds to 604 mPa.s at 20° C., and then cooled to 20° C.

Stage 2 (S2)

1,488 Parts (19.84 molar parts of $CH_2O$) of a 40% strength by weight aqueous formaldehyde, 1,000 parts (7.94 molar parts) of melamine, 27 parts (0.26 molar part) of sodium bisulfite and 1,712 parts of a urea-formaldehyde condensate with a solids content of 65% and a molar ratio of formaldehyde to urea of 1.77 (corresponding to 20.7 molar parts of formaldehyde and 11.7 molar parts of urea) are added to the above solution. The pH is 9.1. The mixture is heated to 90° C., kept at this temperature until the viscosity is 900 mPa.s, and then cooled to 35° C.

Stage 3 (S3)

432 Parts (7.2 molar parts) of solid urea are added to the mixture, which is cooled to 25° C. during the addition. The viscosity at 20° C. is 480 mPa.s, and the solids content is measured as 63.3%.

This gives the following molar ratios:

| S 1 | Phenol:formaldehyde | 0.5 |
| | Sulfite:phenol | 0.125 |
| | Solids content (measured) | 58.3% by weight |
| S 2 | Melamine:phenol | 2.77 |
| | Formaldehyde (total): melamine plus phenol | 4.28 |
| S 3 | Proportion of urea in % by weight, based on the total mixture | 8.0 |

The resulting resin glue dissolves when mixed with 3.6 times the amount of water at 20° C. and is precipitated to produce a milky turbidity when the solution is diluted further. The precipitate does not settle out. The gelling time (reactivity) after the addition of 1.5% of NH$_4$Cl is 31 minutes at 50° C. and 47 seconds at 100° C.

The shelf life, ie. the time in which the viscosity increases from 480 to 2,500 mPa.s is 7.5 weeks at 25° C.

When the resin glue is cooled to 5° C., the viscosity at this temperature after 3 months is still 2,500 mPa.s, and the resin is therefore processible. The viscosity at 20° C. is 700 mPa.s.

EXAMPLE 2

Stage 1

381.6 parts (5.09 molar parts of CH$_2$O) of a 40% strength by weight aqueous formaldehyde solution, 238.5 parts (2.54 molar parts) of phenol and 39.7 parts (0.32 molar part) of sodium sulfite are heated to 60° C. while stirring, and the sodium sulfite dissolves. The temperature increases to 100° C., and the pH is 9. The mixture is brought to 90° C., kept at this temperature until the viscosity corresponds to 584 mPa.s at 20° C., and then cooled to 20° C.

Stage 2

1,896 Parts (25.28 molar parts of CH$_2$O) of 40% strength by weight aqueous formaldehyde solution, 1,250 parts (9.92 molar parts) of melamine, 30 parts (0.29 molar part) of sodium bisulfite and 1,314 parts of a urea-formaldehyde condensate with a solids content of 65% and a molar ratio of formaldehyde to urea of 1.77 (corresponding to 15.9 molar parts of formaldehyde and 8.98 molar parts of urea) are added to the above solution. The pH is 9. The mixture is heated to 90° C., kept at this temperature until the viscosity is 930 mPa.s, and then cooled to 35° C.

Stage 3

840 Parts (14.0 molar parts) of urea are added to the mixture, which is cooled to 20° C. during the addition. The viscosity at 20° C. is 355 mPa.s, and the solids content is measured at 63.8%.

This gives the following molar ratios:

| S 1 | Phenol:formaldehyde | 0.5 |
| | Sulfite:phenol | 0.126 |
| | Solids content (measured) | 57.9% by weight |
| S 2 | Melamine:phenol | 3.91 |
| | Formaldehyde (total): melamine plus phenol | 3.71 |
| | Proportion of urea in % by weight, based on the total amount | 14.02 |

The resulting resin glue dissolves when mixed with 3 times the amount of water at 20° C., and is precipitated to produce a milky turbidity when the solution is diluted further. The precipitate does not settle out. The gelling time (reactivity) after the addition of 1.5% of NH$_4$Cl is 33 minutes at 50° C. and 45 seconds at 100° C.

The shelf life, ie. the time in which the viscosity increases from 355 to 2,500 mPa.s, is 12 weeks at 25° C.

When the resin glue is cooled to 5° C., the viscosity only reaches 1,500 mPa.s after 3 months, and the resin is thus processible.

COMPARATIVE EXAMPLE

Stage 1

379.6 Parts (5.06 molar parts of CH$_2$O) of a 40% strength by weight aqueous formaldehyde solution, 39.8 parts (0.42 molar part) of phenol, 210 parts (1.67 molar parts) of melamine, 6.6 parts (0.05 molar part) of sodium sulfite, 5 parts (0.05 molar part) of sodium bisulfite and 219 parts of a urea-formaldehyde condensate with a solids content of 65% and a molar ratio of formaldehyde to urea of 1.77 (corresponding to 2.65 molar parts of formaldehyde and 1.5 molar parts of urea) are combined.

The suspension formed is heated to 90° C., while stirring, and kept at this temperature until the viscosity is 840 mPa.s. The pH of the mixture is 9.5. The mixture is cooled to 35° C.

Stage 2

140 Parts (2.33 molar parts) of urea are added to the mixture, which is cooled to 20° C. during the addition. The viscosity is 340 mPa.s at 20° C., and the solids content is measured as 63.9%.

This gives the following molar ratios:

| Phenol:formaldehyde | 0.08 |
| Sulfite:phenol | 0.12 |
| Melamine:phenol | 3.98 |
| Formaldehyde (total): melamine plus phenol | 3.69 |
| Proportion of urea in % by weight, based on the total mixture | 14.0 |

The resulting resin glue just dissolves when mixed with the same amount of water at 20° C. and, when diluted further, is precipitated in the form of large flat tacky cakes, some of which adhere to the walls of the vessel; a water-insoluble deposit is formed immediately at the bottom of the vessel.

The gelling time (reactivity) after the addition of 1.5% of NH$_4$Cl is 39 minutes at 50° C. and 61 seconds at 100° C.

EXAMPLE 3

Stage 1

82.1 Parts (1.1 molar parts of CH$_2$O) of a 40% strength by weight aqueous formaldehyde solution, 51.3 parts (0.55 molar part) of phenol and 8.35 parts (0.07 molar part) of sodium sulfite are heated to 60° C. while stirring, and the sodium sulfite dissolves. The temperature increases to 100° C. as a result of the exothermic reaction, and the pH of the mixture is 9.1. The mixture is brought to 90° C., kept at this temperature until the viscosity corresponds to 346 mPa.s at 20° C., and then cooled to 20° C. The solids content is 57.4% by weight.

Stage 2

240 Parts (3.2 molar parts of $CH_2O$) of a 40% strength by weight aqueous formaldehyde solution, 180 parts (1.43 molar parts) of melamine, 5 parts (0.05 molar part) of sodium bisulfite and 447 parts of a urea-formaldehyde condensate with a solids content of 65% and a molar ratio of formaldehyde to urea of 1.77 (corresponding to 5.4 molar parts of formaldehyde and 3.05 molar parts of urea) are added to the above solution. The pH is 9.0. The mixture is heated to 90° C., kept at this temperature until the viscosity corresponds to 660 mPa.s at 20° C., and then cooled to 25° C. The solids content is measured as 64.3%.

This gives the following molar ratios:

| S 1 | Phenol:formaldehyde | 0.5 |
|---|---|---|
|  | Sulfite:phenol | 0.127 |
| S 2 | Melamine:phenol | 2.6 |
|  | Formaldehyde (total): melamine plus phenol | 4.9 |

The resulting resin glue dissolves when mixed with 4 times the amount of water at 20° C., and is precipitated to produce a milky turbidity when diluted further. The precipitate does not settle out.

EXAMPLE 4

Stage 1

744.8 Parts (9.93 molar parts of $CH_2O$) of a 40% strength by weight aqueous formaldehyde solution, 465.5 parts (4.95 molar parts) of phenol and 77.6 parts (0.62 molar part) of sodium sulfite are heated to 60° C. while stirring, and the sulfite dissolves. The temperature increases to 100° C. as a result of the exothermic reaction, and the pH is 9.1. The mixture is brought to 90° C., kept at this temperature until the viscosity corresponds to 605 mPa.s at 20° C., and then cooled to 20° C.

Stage 2

2,486 Parts (33.15 molar parts of $CH_2O$) of a 40% strength by weight aqueous formaldehyde solution, 1,288 parts (10.2 molar parts) of melamine, 50 parts (0.48 molar part) of sodium bisulfite and 4,887 parts of a urea-formaldehyde condensate with a solids content of 65% and a molar ratio of formaldehyde to urea of 1.77 (corresponding to 59.13 molar parts of formaldehyde and 33.39 molar parts of urea) are added to the above solution. The pH of the mixture is 9.0. The mixture is heated to 90° C., kept at this temperature until the viscosity corresponds to 593 mPa.s at 20° C., and then cooled to 20° C. The solids content is measured as 62.9%.

This gives the following molar ratios:

| S 1 | Phenol:formaldehyde | 0.5 |
|---|---|---|
|  | Sulfite:phenol | 0.125 |
| S 2 | Melamine:phenol | 2.06 |
|  | Formaldehyde (total): melamine plus phenol | 6.75 |

The resulting resin glue dissolves when mixed with 9 times the amount of water at 20° C., and is precipitated to produce a milky turbidity when the solution is diluted further. The precipitate does not settle out.

EXAMPLE 5

Stage 1

3.68 Parts (49.0 molar parts of $CH_2O$) of a 40% strength by weight aqueous formaldehyde solution, 2.3 parts (24.5 molar parts) of phenol and 0.50 part (4 molar parts) of sodium sulfite are brought to 60° C. while stirring, and the sodium sulfite dissolves. The temperature increases to about 100° C. as a result of the reaction, and the pH is 9.2.

The mixture is brought to 90° C., kept at this temperature until the viscosity corresponds to 380 mPa.s at 20° C., and then allowed to cool. The solids content is 59.6%.

Stage 2

33.75 Parts (450 molar parts of $CH_2O$) of a 40% strength by weight aqueous formaldehyde solution, 22.7 parts (180.2 molar parts) of melamine and 28.08 parts of a commercial aqueous urea-formaldehyde condensate (UF) with a solids content of 65% and a molar ratio of formaldehyde to urea of 1.77 (corresponding to 340 molar parts of formaldehyde and 192 molar parts of urea) are added to the solution obtained. The pH of the mixture is 9.0. The mixture is brought to 90° C., kept at this temperature until the viscosity is 700 mPa.s, and then cooled to 35° C.

Stage 3

9 Parts (150 molar parts) of urea are added to the solution obtained, which is cooled to 25° C. during the addition. The viscosity is 398 mPa.s at 20° C., and the solids content is measured as 62.6%.

This gives the following molar ratios:

| S 1 | Phenol:formaldehyde | 0.5 |
|---|---|---|
|  | Sulfite:phenol | 0.163 |
| S 2 | Melamine:phenol | 7.36 |
|  | Formaldehyde (total): melamine plus phenol | 4.10 |
| S 3 | Proportion of urea in % by weight, based on the solution | 9.0 |

The resin glue dissolves when mixed with twice the amount of water at 20° C., and is precipitated to produce a milky turbidity when the solution is diluted further. The precipitate does not settle out.

The gelling time (reactivity) after the addition of 1.5% of $NH_4Cl$ as a 15% strength aqueous solution is 30 minutes at 50° C. and 40 seconds at 100° C. The shelf life, expressed as the time in which the viscosity increases from 398 mPa.s to 2,500 mPa.s, is 12 weeks at 25° C.

Performance Test 70 parts of water, 66 parts of a 50% strength paraffin emulsion and 88 parts of a commercial hardener solution are mixed in a conventional manner with 1,000 parts each of resin solutions from Examples 1 and 2 and a commercial resin of corresponding total composition to give a resin glue liquor.

Standard spruce wood chips are treated with this liquor so that the resin content (solids/solids) is 12% and the moisture content 11.2%. 18 mm thick chipboards are produced by pressing the mixture for 240 seconds at 180° C.

The water resistance is determined in accordance with DIN 68,763 (V 100) and the release of formaldehyde is determined by the FESYP perforator method.

The test gave the following results:

| Property | Sample from Example 1 | Sample from Example 2 | Comparison with a commercial resin of corresponding total composition |
| --- | --- | --- | --- |
| Shearing strength/ V 100 [n/mm$^2$] | 1.1 | 1.1 | 1.3 |
| Release of formaldehyde, as determined by the FESYP method [mg HCHO/100 g of absolutely dry board] | 22 | 8 | 44 |

We claim:

1. A process for the preparation of an aqueous solution of a condensate which can be used as a resin glue and comprises formaldehyde and at least urea, melamine and phenol, the molar ratio of phenol to the sum of melamine and urea being not more than 0.25:1 and the molar ratio of urea to melamine being from 0.2:1 to 1:0.2 for a total molar ratio of formaldehyde to the sum of melamine, urea and phenol of from about 1.1 to 2, wherein (a) phenol, formaldehyde and from 0.02 to 0.35 mole of an alkali metal bisulfite per mole of phenol are reacted to give a phenol-formaldehyde condensate, and (b) formaldehyde and urea in the molar ratio of not more than 2.5:1 are reacted to give a urea-formaldehyde condensate, and (c) the products (a) and (b) together in turn are reacted with melamine and formaldehyde in such a ratio that the molar ratios of melamine, urea, phenol and formaldehyde mentioned at the outset are either obtained directly or (d) may be obtained only after the product obtained according to (c) is reacted further with urea in an amount of not more than 75% of the total amount of urea intended.

2. The process of claim 1, wherein the reaction (a) of phenol, formaldehyde and alkali metal bisulfite is carried out at from 50° to 150° C. and at a pH of from 7.5 to 12.

3. The process of claim 1, wherein the product is reacted further, in step (c), with melamine and formaldehyde at from 75° to 150° C. and at a pH of from 7.5 to 11.

4. The process of claim 1, wherein the further reaction (d) with urea is carried out at from 10° to 60° C. and at a pH of from 7.5 to 11.

* * * * *